Patented Mar. 10, 1953

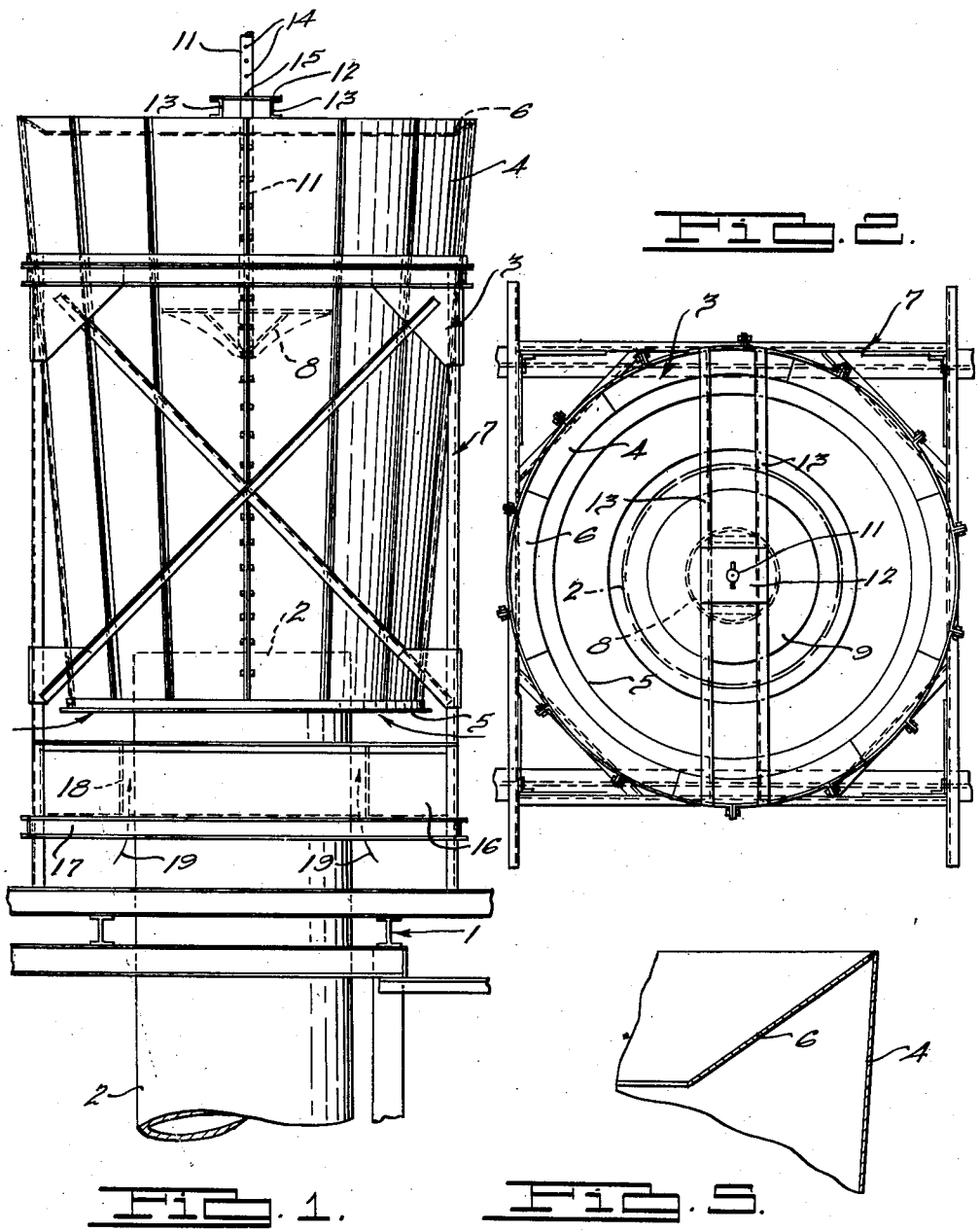

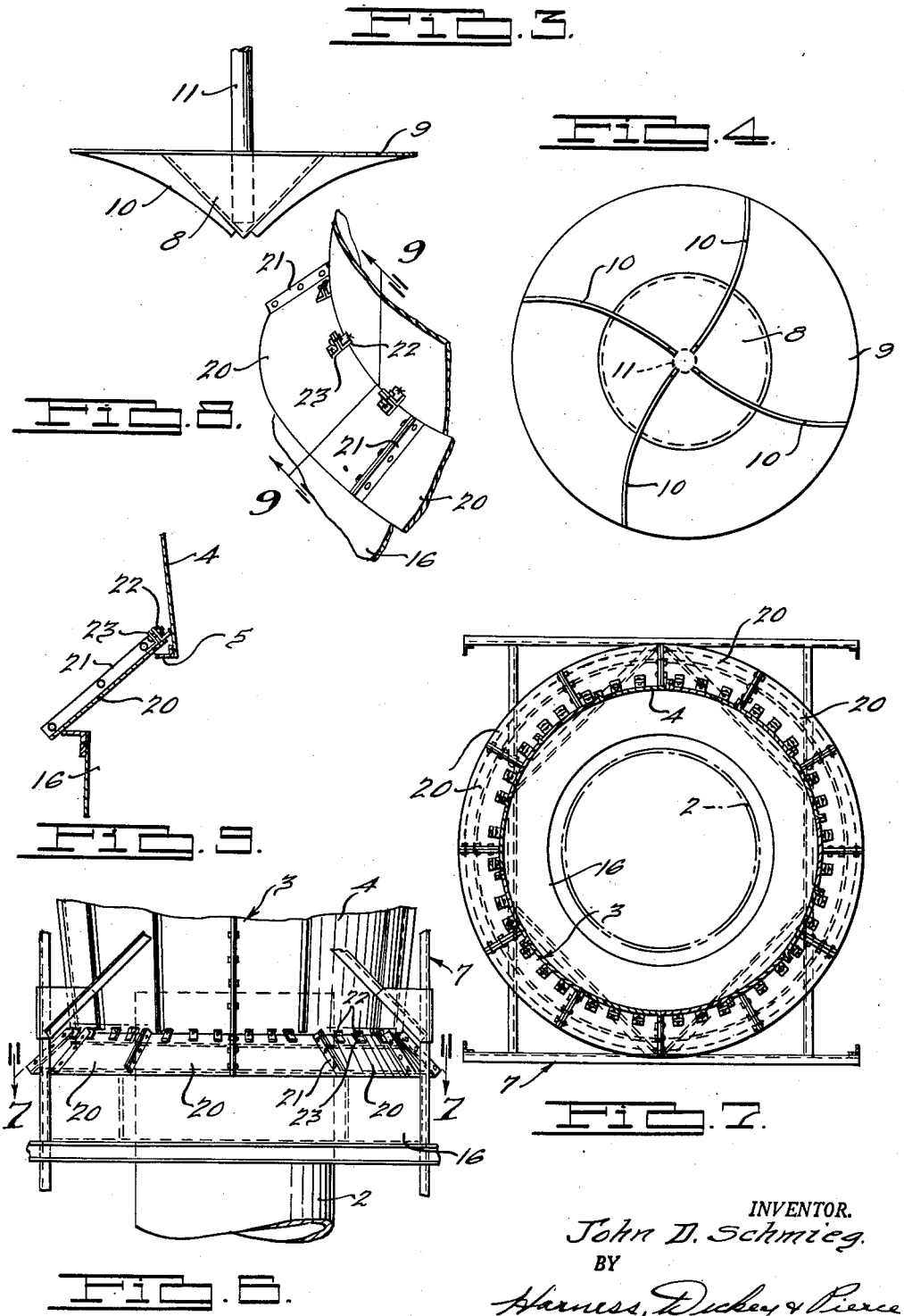

2,630,880

UNITED STATES PATENT OFFICE 2,630,880

CUPOLA DUST ARRESTER

John D. Schmieg, Pleasant Ridge, Mich., assignor to Schmieg Industries, Inc., Detroit, Mich., a corporation of Michigan Application May 4, 1950, Serial No. 160,029

1 Claim. (Cl. 183—103)

The present invention relates to apparatus for separating foreign materials from air discharged from a cupola stack.

Air discharged from a cupola stack carries with it foreign materials, and it is desirable to separate and collect such foreign materials so that they will not be scattered over the surrounding neighborhood. The separation problem is a difficult one because of the intense heat of the air and the materials discharged from the stack. At such temperatures it is, first, difficult to separate the material and, second, the intense heat tends to destroy the material forming the arrester in a comparatively short time. According to the present invention, an arrester is provided which comprises an upwardly diverging conical member, open at both its ends, and so positioned that the top of the cupola stack projects within the conical member through the bottom, smaller end. The bottom end of the conical member is spaced radially from the stack and is open to the atmosphere so that a Venturi effect results which causes air to be pulled into the separator from the atmosphere, with the colder atmospheric air enveloping the air discharged from the stack. The effect of this is to considerably reduce the temperature of the air issuing from the cupola, resulting in good separation and lower operating temperatures, thereby giving the apparatus a longer life.

One of the primary objects of the present invention is to provide an apparatus which accomplishes rapid cooling of the air as it issues from a cupola stack so that the foreign materials may be readily separated from the air blast, and so that the separating apparatus will have a relatively longer life.

Other objects of the invention will become apparent from the following specification, the drawings relating thereto, and from the claim hereinafter set forth.

In the drawings, in which like numerals are used to designate like parts throughout the several different views:

Figure 1 is a side elevational view of a cupola dirt or dust arrester in its relationship to the cupola stack;

Fig. 2 is a top plan view of the structure shown in Fig. 1;

Fig. 3 is a side elevational view of a baffle employed with the apparatus shown in Fig. 1;

Fig. 4 is a bottom plan view of the structure shown in Fig. 3;

Fig. 5 is a fragmentary cross-sectional view of a fragment of the discharge top of the structure shown in Fig. 1;

Fig. 6 is a partial view similar to Fig. 1, illustrating a modified form thereof;

Fig. 7 is a cross-sectional and elevational view, taken substantially along the line 7—7 of Fig. 6;

Fig. 8 is a perspective view of a portion of the structure shown in Fig. 6; and

Fig. 9 is a cross-sectional view taken substantially along the line 9—9 of Fig. 8.

Referring to the drawings, and referring particularly to Figs. 1-5 thereof, an embodiment of the apparatus for removing foreign materials from the air discharged from the cupola stack is illustrated. Framework on top of the cupola is generally indicated at 1, and the vertical cupola stack is shown at 2 projecting upwardly above the framework 1.

An arrester is generally indicated at 3, and such arrester comprises an upwardly and outwardly diverging frusto-conical member 4 which may be formed of a plurality of vertical sections having mating flanges which are bolted together to form a hollow member, open at its lower and upper ends. An angle member 5 is secured to the bottom edge and a downwardly and inwardly directed flange 6 is formed at the upper or outlet edge.

The hollow member 4 is supported on and fixed to a framework, generally indicated at 7, which in turn is supported on the framework 1. The framework 7 comprises vertical and horizontal frame members, together with angle members so arranged as to provide a rigid support for the arrester structure which is fixed to the frame. The hollow member 4 is positioned on the frame so that the upper end of the stack projects within the lower end of the hollow member, as shown by the dotted lines in Fig. 1. The lower edge of the member 4 adjacent the angle 5 is radially spaced from the periphery of stack 2, and the framework is open adjacent the lower end so that this end is open to the atmosphere.

A baffle, in the form of a conical member 8, is disposed within the hollow member 4 substantially in a central position in the path of air passing therethrough. Such conical member 8 has a disk 9 secured to the base thereof, and spiral flanges 10 are fixed to the outer surface of the cone 8 and to the undersurface of the disk 9, with the surfaces of the vanes, or deflectors, 10 substantially normal to the surface of the cone 8. The cone assembly is supported by a rod 11 which extends above the upper end of the hollow member 4. The rod 11 projects through an opening in plate 12 which is fixed to transversely extending channel members 13. The channel members 13 are supported at their ends on the top of the member 4.

So that the cone 8 may be vertically adjusted, it is provided with a plurality of longitudinally spaced openings 14 therein and a mounting pin 15 may be positioned in the desired opening 14 to fix the cone assembly in the desired position.

In the embodiment illustrated, the baffle assembly is stationary, but it may be rotated. This would involve providing a suitable drive mechanism connected to the shaft 11 for rotating the shaft and providing suitable bearings for supporting the shaft 11.

The blast of air issuing from the cupola stack 2 has an intense heat and carries with it foreign particles of varying sizes. With the device of the present invention, the hot blast projects upwardly through the hollow member 4 and as it does so the relatively cool atmospheric air is drawn into the lower end of the hollow member 4 in the direction indicated by the arrows in Fig. 1, so that this relatively cool air envelopes the outlet end of the stack 2 and envelopes the hot gases issuing therefrom. The position of the outlet end of the stack 2 with respect to the lower end of member 4, and the issuing blast of hot air, creates a Venturi effect which draws considerable cold air into the frusto-conical member 4. Such colder air quickly reduces the temperature of the air from the cupola to facilitate separation of foreign materials from the air, and further serves to insulate to some extent the metal of the member 4 so that it does not burn out as quickly as in prior constructions.

As the air moves upwardly through the member 4, the conical member 8 and the spiral vanes 10 create a spiraling action which further assists in the separation of the foreign materials.

The flange 6 also assists in the separation of the foreign materials, and the depth of such flange may be varied. For example, it may be desirable to extend the flange 6 downwardly and inwardly a considerable distance to effect substantial trapping of the foreign particles. The heavier particles are readily removed and, if desired, the conical member may be tapped under the flange 6 and the air drawn out and passed through a wet separator to affect a further separation of the lighter particles.

In order to collect the heavier particles as they are separated from the air and as they drop to the bottom, a circular pan 16 may be supported on a frame member 17 embracing the stack 2. Such pan has the usual bottom, an annular outer wall, and an annular inner wall 18 which is spaced from the side of the stack 2. Thus, atmospheric air may pass around the stack and through the space indicated by the arrows 19 (Fig. 1) to relieve the pan of the intense heat in the stack. An access door may be provided in the pan 16 so that it may be cleaned at the necessary intervals.

Referring to Figs. 6-9, a modified construction is illustrated in which the amount of air flowing into the lower end of the member 4 may be controlled for best results on some installations. In the embodiment shown in Fig. 1, the entire bottom of the member 4 is open to the atmosphere. In the embodiment illustrated in Figs. 6-9, sectional closure plates 20 are provided which are curved so that when joined together they will follow the curvature around the bottom end of the frusto-conical member 4. The sections 20 have flanges 21 formed at their ends which mate with the adjacent flanges and may be connected thereto by bolts. The sectional plates 20 may be mounted on the member 4 adjacent the lower end by means of L-clips 22 and 23. The L-clips 22 may be welded to the adjacent surface of the member 4, and the clips 23 welded to the outer surface of the members 20 at spaced intervals therealong. The adjacent surfaces of the clips 22 and 23 may then be removably attached by means of nuts and bolts. By using the desired number of sections 20, the amount of atmospheric air entering the lower end of the member 4 may be effectively controlled.

The operation of the device shown in Figs. 6-9 is otherwise the same as that described above.

Formal changes may be made in the specific embodiment above described without departing from the spirit of the invention, the scope of which is commensurate with the appended claim.

What is claimed is:

A separator for separating foreign materials from air discharged from a cupola stack comprising a frusto-conical, upwardly diverging, hollow member having an open inlet end into which the upper end of a cupola stack projects and having an open outlet end, the lower edge of said hollow member being open to the atmosphere and being radially spaced from said stack to provide an outside air passage upwardly around said stack, removable closure members disposed adjacent said lower edge to control the amount of air entering said passage from the atmosphere, and baffle means disposed within said member in the path of air movement therethrough.

JOHN D. SCHMIEG.

REFERENCES CITED

The following references are of record in the file of this patent:

UNITED STATES PATENTS

| Number | Name | Date |
|---|---|---|
| 7,040 | Radley et al. | Jan. 22, 1850 |
| 111,507 | Andrews | Feb. 7, 1871 |
| 336,311 | Gordon | Feb. 16, 1886 |
| 349,337 | Buckley | Sept. 21, 1886 |
| 1,100,034 | Swem | June 16, 1914 |
| 1,100,035 | Swem | June 16, 1914 |
| 1,281,142 | Cox | Oct. 8, 1918 |
| 1,638,451 | Nixon | Aug. 9, 1927 |

FOREIGN PATENTS

| Number | Country | Date |
|---|---|---|
| 394,381 | France | Nov. 25, 1908 |